C. M. LONG.
MOTOR ATTACHMENT FOR VEHICLES.
APPLICATION FILED MAR. 26, 1918.

1,288,068.

Patented Dec. 17, 1918.

INVENTOR.
Curtis M. Long.
By Owen, Owen & Crampton,
His attys.

UNITED STATES PATENT OFFICE.

CURTIS M. LONG, OF NAPOLEON, OHIO, ASSIGNOR TO ELON D. GAUNTLETT, OF TRAVERSE CITY, MICHIGAN.

MOTOR ATTACHMENT FOR VEHICLES.

1,288,068.  Specification of Letters Patent.  Patented Dec. 17, 1918.

Application filed March 26, 1918. Serial No. 224,857.

*To all whom it may concern:*

Be it known that I, CURTIS M. LONG, a citizen of the United States, and a resident of Napoleon, in the county of Henry, State of Ohio, have invented a certain new and useful Motor Attachment for Vehicles; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to propelling means for vehicles, and particularly to a motor attachment for bicycles, and has for its object the provision of a simple, light and improved attachment of this class, which is capable of being easily and quickly attached to a bicycle in operative relation to one of the wheels thereof, preferably the front wheel, and of being adjusted in a simple and efficient manner by the operator, while riding on the bicycle, to engage the motor wheel with, or release it from, driving engagement with the vehicle wheel. Other objects and advantages of the invention will be apparent from the following detailed description thereof.

While the invention, in its broader aspect, is capable of embodiment in numerous forms, a preferred embodiment thereof is illustrated in the accompanying drawings in which—

Figure 1:
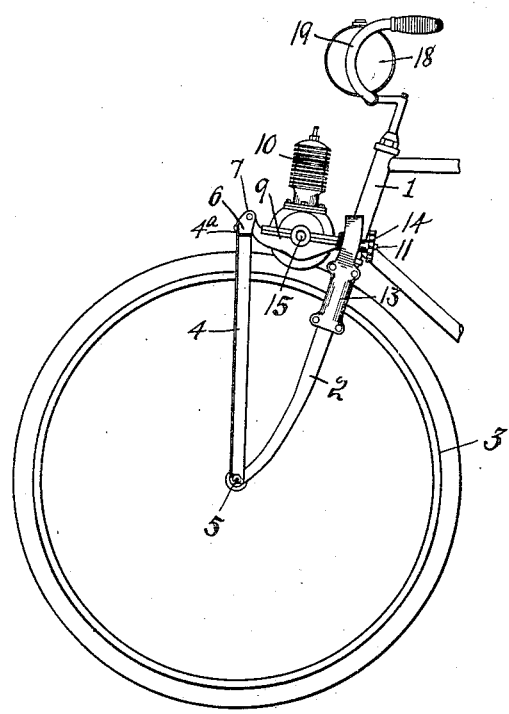
Figure 2:
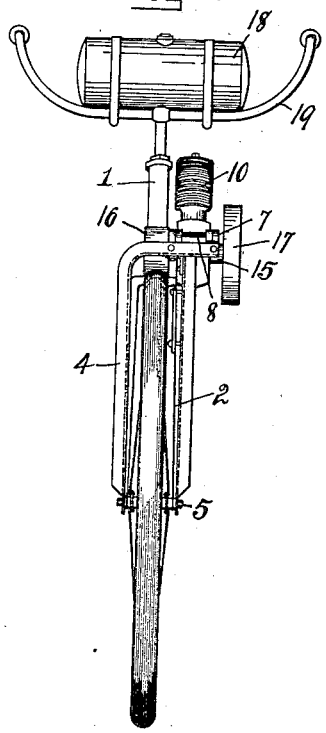
Figure 3:
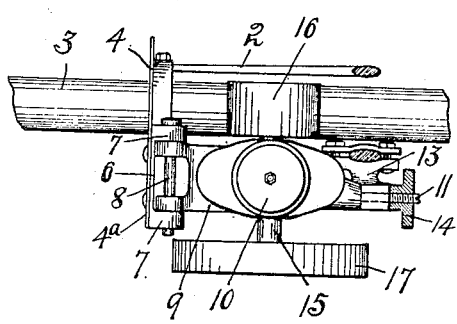
Figure 4:
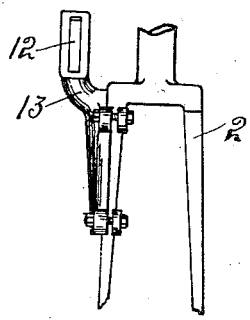

Figure 1 is a side elevation of the front end portion of the bicycle with the apparatus embodying the invention attached thereto, with the motor fly wheel removed. Fig. 2 is a front elevation thereof. Fig. 3 is an enlarged top plan view thereof with portions of the bicycle broken away, and Fig. 4 is a rear elevation of a portion of the front fork of the bicycle with a part of the apparatus attached thereto.

Referring to the drawings, 1 designates a bicycle frame, having the front fork 2, and 3 the front wheel mounted in said fork.

A yoke 4 of inverted U-form and made in the present instance from angle iron, straddles the wheel 3 in advance of the fork 2, and has the lower ends of its legs fixed to, or supported by the respective ends of the front wheel axle 5 at the outer sides of the fork arms. It is preferable to connect the yoke to the axle by projecting the axle ends through apertures in the yoke ends, and to then tighten the customary binding nuts on the axle ends without the yoke. The top or looped end of the yoke 4 is formed with a lateral horizontal extension 4ª, in the angle of which is fixedly mounted a bracket 6 having the spaced ears 7, which are apertured to form bearings for the ends of a short shaft or pintle 8. An arm 9, adapted to support a small motor 10, is hinged at its forward end to the shaft or pintle 8 between the ears 7 and has its rear end provided with a threaded stud 11, which projects through a vertical elongated slot 12 in a bracket arm 13 and is clamped in vertically adjusted position to said arm by a hand nut 14 threaded on to said stud. The bracket arm 13 is removably clamped to the adjacent side of the fork 2.

The motor 10, which is small and light in its construction and preferably of the single cylinder internal combustion engine type, is carried by the arm 9 for swinging movements therewith and has its crank shaft 15 projected at one end over the wheel 3 and provided at such end with a friction drive wheel 16 adapted to be lowered into or raised from frictional driving engagement with the wheel periphery by vertical swinging movements of the bracket arm 9. The other end of the motor shaft is provided with a fly wheel 17. The operating fluid may be supplied to the motor from a tank 18 supported by the handle bars 19 or from any other suitable source of supply.

It is evident that I have provided a simple, light and inexpensive motor attachment for bicycles, which is capable of being easily and quickly attached to the front fork of any bicycle, or removed therefrom, and of being adjusted by the operator from his seat on the bicycle to place the drive wheel 16 thereof into or out of engagement with the wheel periphery.

I wish it understood that my invention is not limited to any specific construction, arrangement or form of the parts, or to the particular means illustrated for attaching the apparatus to a bicycle, as it is capable of numerous modifications and changes without departing from the spirit of the claims.

Having thus described my invention, what I claim as new, and desire to secure by Letters Patent, is

1. The combination with the front fork of a bicycle and the supporting wheel therefor, of a yoke straddling said wheel and having its ends fixed to and supported by the respective ends of the wheel axle, a bracket fixed to one side of said fork and having a vertically elongated opening, an arm hinged to the upper portion of said yoke for movements transversely of the wheel axis and having its free end portion projected through said opening and shouldered against said bracket, means carried by said arm and coöperating with its shouldered portion to releasably clamp the bracket to retain the arm in adjusted relation thereto, and a motor carried by said arm and having a friction drive member adapted to be placed into or out of driving engagement with the peripheral portion of said bicycle wheel by adjustment of said arm.

2. The combination with the front fork of a bicycle and a supporting wheel therefor, of a yoke straddling said wheel and having its ends fixed to and supported by the respective ends of the wheel axle, said yoke being formed of angle-iron and having its top or crown portion horizontally disposed, a hinge bracket fixed to the crown portion of said yoke in the angle of its angle-iron, an arm hinged to and projecting rearwardly from said bracket for vertical tilting movements, means carried by said fork for coöperating with said arm to retain it in adjusted relation, and a motor carried by said arm and adapted to be placed into or out of frictional driving engagement with the periphery of said bicycle wheel.

In testimony whereof, I have hereunto signed my name to this specification.

CURTIS M. LONG.